US012248154B2

(12) United States Patent
Raij et al.

(10) Patent No.: US 12,248,154 B2
(45) Date of Patent: Mar. 11, 2025

(54) TETHER ACTUATION SYSTEMS AND METHODS FOR VISUALIZATION DEVICE

(71) Applicant: Universal City Studios LLC, Universal City, CA (US)

(72) Inventors: Andrew Brian Raij, Winter Park, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/483,368

(22) Filed: Oct. 9, 2023

(65) Prior Publication Data
US 2024/0036335 A1    Feb. 1, 2024

Related U.S. Application Data

(63) Continuation of application No. 17/355,659, filed on Jun. 23, 2021, now Pat. No. 11,803,063.
(Continued)

(51) Int. Cl.
*G02B 27/01*       (2006.01)
*A63G 31/00*      (2006.01)
(Continued)

(52) U.S. Cl.
CPC ......... *G02B 27/0176* (2013.01); *A63G 31/00* (2013.01); *G06F 1/163* (2013.01)

(58) Field of Classification Search
CPC .... A63G 31/00; A63G 31/16; G02B 27/0172; G02B 27/0176; G06F 1/163
(Continued)

(56) References Cited

U.S. PATENT DOCUMENTS 5,015,933 A    5/1991  Watkins et al.
5,844,530 A    12/1998 Tosaki
(Continued)

FOREIGN PATENT DOCUMENTS

CN    109375375 A    2/2019

OTHER PUBLICATIONS

PCT/US2021/045146 International Search Report and Written Opinion mailed Nov. 25, 2021.

*Primary Examiner* — Kien T Nguyen
(74) *Attorney, Agent, or Firm* — Fletcher Yoder, P.C.

(57) ABSTRACT

An augmented reality, virtual reality, and/or mixed reality (AR/VR) system includes a wearable visualization assembly configured to be worn by a user and to display virtual features for visualization by the user during a ride stage of an attraction. The wearable visualization assembly includes a sensor configured to provide feedback indicative of an attachment status of the wearable visualization assembly on the user. The AR/VR system also includes a retraction assembly coupled to the wearable visualization assembly via a tether and configured to retrieve the tether. The AR/VR system further includes a controller communicatively coupled to the retraction assembly and the sensor. The controller is configured to actuate the retraction assembly to retrieve the tether to transition the wearable visualization assembly to a storage configuration in response to the feedback indicating that the wearable visualization assembly is in a detached configuration during the ride stage.

20 Claims, 7 Drawing Sheets

Related U.S. Application Data

(60) Provisional application No. 63/067,154, filed on Aug. 18, 2020.

(51) Int. Cl.
*G06F 1/16* (2006.01)
*A63G 31/16* (2006.01)

(58) Field of Classification Search
USPC ...................................... 472/43, 60, 61, 130
See application file for complete search history.

(56) References Cited

U.S. PATENT DOCUMENTS

| | | |
|---|---|---|
| 9,778,467 B1 | 10/2017 | White et al. |
| 9,933,624 B1 | 4/2018 | White et al. |
| 2017/0252658 A1 | 9/2017 | Reveley |
| 2018/0074599 A1 | 3/2018 | Garcia et al. |
| 2019/0227328 A1 | 7/2019 | Coatney |
| 2020/0225715 A1 | 7/2020 | Goergen et al. |
| 2021/0387103 A1* | 12/2021 | Chung ............... G02B 27/0176 |

\* cited by examiner

TETHER ACTUATION SYSTEMS AND METHODS FOR VISUALIZATION DEVICE

CROSS-REFERENCE TO RELATED APPLICATIONS

This application is a continuation of U.S. application Ser. No. 17/355,659, entitled "TETHER ACTUATION SYSTEMS AND METHODS FOR VISUALIZATION DEVICE," filed Jun. 23, 2021, which claims priority from and the benefit of U.S. Provisional Application Ser. No. 63/067,154, entitled "TETHER ACTUATION SYSTEMS AND METHODS FOR VISUALIZATION DEVICE," filed Aug. 18, 2020, which are each hereby incorporated by reference in their entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various entertainment attractions that are useful in providing enjoyment to guests. The entertainment attractions of the amusement park may have different themes that are specifically targeted to certain audiences. For example, certain entertainment attractions may include themes that are traditionally of interest to children, while other entertainment attractions may include themes that are traditionally of interest to more mature audiences. It is recognized that it may be desirable to enhance the immersive experience for guests in the entertainment attractions, such as by augmenting the themes with virtual features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an augmented reality, virtual reality, and/or mixed reality (AR/VR) system includes a wearable visualization assembly configured to be worn by a user and to display virtual features for visualization by the user during a ride stage of an attraction. The wearable visualization assembly includes a sensor configured to provide feedback indicative of an attachment status of the wearable visualization assembly on the user. The AR/VR system also includes a retraction assembly coupled to the wearable visualization assembly via a tether and configured to retrieve the tether. The AR/VR system further includes a controller communicatively coupled to the retraction assembly and the sensor. The controller is configured to actuate the retraction assembly to retrieve the tether to transition the wearable visualization assembly to a storage configuration in response to the feedback indicating that the wearable visualization assembly is in a detached configuration during the ride stage.

In one embodiment, a method of operating an augmented reality, virtual reality, and/or mixed reality (AR/VR) system includes locking, via a coupling system, a visualization device to an interface device to provide a wearable visualization assembly configured to be worn by a user during a ride stage of an attraction. The method also includes generating, via a sensor of the wearable visualization assembly, feedback indicative of an attachment status of the wearable visualization assembly on the user and monitoring, via a controller, the feedback. The method further includes actuating, via the controller, a retraction assembly coupled to the wearable visualization assembly to transition the wearable visualization assembly to a storage configuration in response to the feedback indicating that the wearable visualization assembly transitioned from an attached configuration to a detached configuration during the ride stage.

In one embodiment, an augmented reality, virtual reality, and/or mixed reality (AR/VR) system includes a ride vehicle of an attraction and a visualization device coupled to the ride vehicle via a tether. The visualization device is configured to display virtual features for visualization by a user of the visualization device. The AR/VR system includes an interface device configured to be worn by the user and to engage with the visualization device. The AR/VR system also includes a retraction assembly coupled to the ride vehicle and the tether, where the retraction assembly is configured to retrieve the tether to reduce an extension length of the tether. The AR/VR system further includes a controller electrically coupled to the retraction assembly. The controller is configured to actuate the retraction assembly to retrieve the tether to transition the visualization device and the interface device to a storage receptacle of the ride vehicle in response to receiving feedback from a sensor indicating that the visualization device is detached from the user during a ride stage of the attraction.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
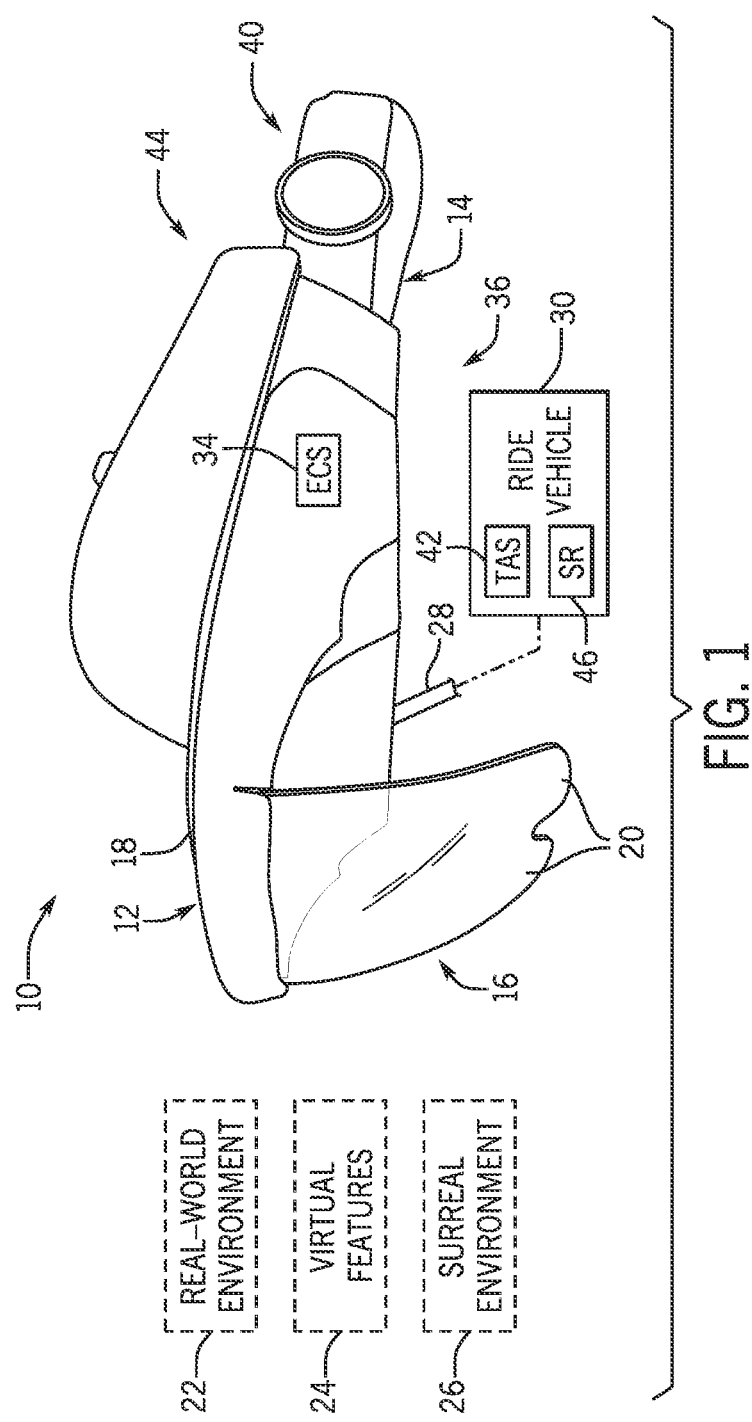
FIG. 1 is a perspective view of a visualization device and an interface device of an augmented reality, virtual reality, and/or mixed reality system (AR/VR system), wherein the visualization device and the interface device are in an engaged configuration, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (a combination of AR and VR) system (AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive.

The AR/VR system includes a guest interface device, also referred to herein as an interface device, which is configured to removably couple to a head of the guest. The AR/VR system also includes a visualization device, such as a head mounted display (e.g., electronic goggles or displays, eyeglasses), which is configured to couple to the interface device (e.g., while the interface device is positioned on the head of the guest). Thus, the interface device enables the guest to wear the visualization device on the head of the guest. The visualization device may enable the guest to view certain virtual features. The visualization device may be utilized to enhance the guest experience by overlaying the virtual features onto a real-world environment of the amusement park attraction, by providing adjustable virtual features to provide different virtual environments while the guest is in the amusement park attraction, and so forth. For example, in some embodiments, the visualization device may be coupled to a ride vehicle of the attraction and configured to travel with the ride vehicle along a path of the attraction. As such, the guest may utilize the visualization device during a ride cycle of the attraction to view AR, VR, and/or mixed reality scenes.

Embodiments of the present disclosure are directed toward a tether actuation system that enables controllable positioning and/or securement of the visualization device (and the interface device when the visualization device and the interface device are coupled together) within the ride vehicle. In an embodiment, the tether actuation system includes a tether (e.g., a cable) having a first end portion that is coupled to the visualization device and a second end portion that is coupled to a retraction assembly. The retraction assembly may be disposed within a restraint, such as a lap bar, of the ride vehicle and/or another support structure of the ride vehicle. The ride vehicle may include a storage receptacle that may be formed within the restraint and/or another support structure of the ride vehicle and that is configured to at least partially receive and engage with the visualization device. The tether may extend from the retraction assembly, through the storage receptacle, and to the visualization device. The retraction assembly includes an actuator (e.g., a drum, a spool, a liner actuator) that is configured to selectively retrieve (e.g., spool in, draw in, retract) the tether to decrease an extension length of the tether and to selectively permit release (e.g., unspooling) of the tether to increase the extension length of the tether. As used herein, the "extension length" of the tether may be indicative of a length of the tether extending between the storage receptacle and the visualization device.

A controller (e.g., a controller of the ride vehicle, a controller of the attraction, a separate controller) of the tether actuation system may be configured to operate the retraction assembly to selectively retrieve the tether and/or enable release of the tether based on feedback (e.g., inputs), such as sensor feedback indicating a position of the visualization device relative to the head of the guest and/or ride data indicating a portion of the ride cycle being executed by the ride vehicle. For example, upon determining that the ride vehicle executes a loading stage or operation of the ride cycle (e.g., in which guests board into the ride vehicle), the controller may instruct the retraction assembly to enable release of the tether (e.g., such as when a guest grabs and pulls on the visualization device coupled to the tether). Accordingly, the controller enables a guest boarding the ride vehicle to grab the visualization device, which may be disposed within the storage receptacle, pull/draw the visualization device toward the head of the guest (e.g., to enable release of the tether from the retraction assembly and increase the extension length of the tether), and couple (e.g., engage) the visualization device with the interface device worn by the guest (e.g., disposed on the head of the guest).

The AR/VR system may include a coupling system (e.g., an electromagnetic coupling system) that, upon engagement of the visualization device with the interface device, facilitates retaining the visualization device in an engaged configuration (e.g., a coupled configuration) with the interface device. For example, the electromagnetic coupling system may include one or more electromagnets that are integrated with (e.g., coupled to) the visualization device, the interface device, or both. The electromagnets are configured to selectively engage with (e.g., magnetically couple to) a corresponding reaction material (e.g., one or more strips of metallic material, permanent magnets, other electromagnets) that may be integrated with (e.g., coupled to) the visualization device, the interface device, or both. In an embodiment, the controller may selectively energize the electromagnets to lock (e.g., retain) the visualization device and the interface device in the engaged configuration throughout certain time periods. For example, the controller may lock the visualization device with the interface device (e.g., via activation of the electromagnets) to increase a coupling force to thereby inhibit decoupling of the visualization device from the interface device during, for example, an amusement stage of the ride cycle (e.g., a stage of the ride cycle between a loading stage and an unloading stage of the ride cycle). For clarity, the visualization device and the interface device, when in the engaged configuration, may be collectively referred to herein as a "wearable visualization assembly." It should be appreciated that any of variety of types of coupling systems may be used to retain the visualization device in the engaged configuration with the interface device.

In some cases, during the amusement stage or another stage of the ride cycle, the guest may purposefully or inadvertently decouple the visualization device from the interface device or the entire wearable visualization assembly from the head of the guest. Or in some cases, the visualization device may become dislodged (e.g., decoupled) from the interface device or the entire wearable visualization assembly may become dislodged from the head of the guest. The tether actuation system may include a sensor, or a plurality of sensors, configured to detect removal of the separation of the visualization device from the interface device and/or separation of the wearable visualization assembly from the head of the guest. As an example, in an embodiment, the sensor(s) may include a contact sensor (e.g., a pulse sensor) and/or a proximity sensor that are configured to provide the controller with feedback indicative of whether the wearable visualization assembly is coupled to or decoupled from the head of the guest. Removal of the visualization device or the entire wearable visualization assembly from the head of the guest during an undesirable time period, such as during the amusement stage of the ride cycle, will be referred to herein as a "removal event" of the wearable visualization assembly.

Upon detection of the removal event (e.g., based on received sensor feedback), the controller may instruct the retraction assembly to retract (e.g., spool in, draw in, or otherwise retrieve) the tether to reduce the extension length of the tether and to draw the visualization device or the wearable visualization assembly toward the storage receptacle. The controller may control retraction of the tether until the visualization device or the wearable visualization assembly engages with (e.g., contacts) the storage receptacle and transitions to the storage position or configuration. In an embodiment, upon transiting the visualization device or the wearable visualization assembly to the storage position, the controller may operate the retraction system to apply a threshold tension to the tether to force (e.g., compress) the visualization device or the wearable visualization assembly against a surface or other engagement feature of the storage receptacle. To this end, the controller may ensure that the visualization device or the wearable visualization assembly remains securely affixed and engaged with the storage receptacle throughout a remainder of the amusement stage and does not undesirably move about a cabin and/or seating area of the ride vehicle. That is, the tether actuation system may be configured to transition the visualization device or the wearable visualization assembly to the storage position within the ride vehicle and to retain the visualization device or the wearable visualization assembly in the storage position upon detection of the removal event. Certain embodiments herein may generally refer to the wearable visualization device being retracted by the tether actuation system (e.g., due to the visualization device be engaged with and/or locked to the interface device) to facilitate discussion; however, it should be appreciated that the tether actuation system may also be operable to retract and/or to retain the visualization device, without the interface device, in the storage receptacle (e.g., due to the visualization device being decoupled from the interface device; during a ride cycle where a ride seat of the ride vehicle remains unoccupied and the AR/VR system is not utilized by a guest).

Additionally, in an embodiment having the electromagnets, the controller may deactivate or otherwise control the electromagnets in coordination with the ride cycle, such as to facilitate coupling of the interface device to the visualization device upon a determination that the ride vehicle is in the loading stage of the ride cycle, to lock the interface device to the visualization device during the amusement stage of the ride cycle, and/or to enable decoupling of the interface device from the visualization device upon a determination that the ride vehicle has completed the amusement stage of the ride cycle and entered the unloading stage of the ride cycle, for example. As such, prior to deboarding from the ride vehicle, the guest may separate the interface device from the visualization device regardless of whether the wearable device assembly was retracted into the storage position during the amusement stage of the ride cycle. If the visualization device was not returned to the storage position during the amusement stage of the ride cycle, the visualization device may be retracted into the storage position upon separation of the interface device from the visualization device after completion of the amusement stage of the ride cycle and during deboarding. Additionally, the controller may operate the retraction assembly to again enable release of the tether, such that another guest entering (e.g., boarding) the ride vehicle may withdraw the visualization device from the storage receptacle and equip the visualization device on the corresponding interface device of the guest in accordance with the aforementioned techniques. These and other features will be described below with reference to the drawings.

With the foregoing in mind, FIG. 1 is a perspective view an embodiment of an AR/VR system 10 (e.g., a wearable visualization system) configured to enable a user (e.g., a guest, an amusement park employee, a passenger of a ride vehicle) to experience (e.g., view, interact with) AR/VR scenes. The AR/VR system 10 includes a visualization device 12 (e.g., a head mounted display, a wearable visualization device) and an interface device 14 that are removably coupleable to one another to facilitate usage of the AR/VR system 10.

In the illustrated embodiment, the visualization device 12 includes electronic eyeglasses 16 (e.g., AR/VR eyeglasses, goggles) that are coupled to a housing 18 of the visualization device 12. The electronic eyeglasses 16 may include one or more displays 20 (e.g., transparent, semi-transparent, opaque). In an embodiment, the displays 20 may enable the user to view a real-world environment 22 (e.g., physical structures in the attraction) through the displays 20 with certain virtual features 24 (e.g., AR features) overlaid onto the displays 20 so that the user perceives the virtual features 24 as being integrated into the real-world environment 22. That is, the electronic eyeglasses 16 may at least partially control a view of the user by overlaying the virtual features 24 onto a line of sight of the user. To this end, the visualization device 12 may enable the user to visualize and perceive a surreal environment 26 (e.g., a game environment) having certain virtual features 24 overlaid onto the real-world environment 22 viewable by the user through the displays 20. By way of non-limiting example, the displays 20 may include transparent (e.g., see-through) light emitting diode (LED) displays or transparent (e.g., see-through) organic light emitting diode (OLED) displays.

In an embodiment, the visualization device 12 may completely control the view of the user (e.g., using opaque viewing surfaces). That is, the displays 20 may include opaque or non-transparent displays configured to display the virtual features 24 (e.g., VR features) to the user. As such, the surreal environment 26 viewable by the user may be, for example, a real-time video that includes real-world images of the physical, real-world environment 22 electronically merged with one or more virtual features 24. Thus, in wearing the visualization device 12, the user may feel completely encompassed by the surreal environment 26 and may perceive the surreal environment 26 to be the real-world environment 22 that includes certain virtual features 24. In an embodiment, the visualization device 12 may include features, such as light projection features, configured to project light into one or both eyes of the user so that certain virtual features 24 are superimposed over real-world objects viewable by the user. Such a visualization device 12 may be considered to include a retinal display.

As such, it should be appreciated that the surreal environment 26 may include an AR experience, a VR experience, a mixed reality experience, a computer-mediated reality experience, a combination thereof, or another similar surreal environment. Moreover, it should be understood that the visualization device 12 may be used alone or in combination with other features to create the surreal environment 26. Indeed, as discussed below, the user may wear the visualization device 12 throughout a duration of a ride of an amusement park ride or during another time, such as during a game, throughout a particular area or attraction of an amusement park, during a ride to a hotel associated with the amusement park, at the hotel, and so forth. In an embodiment, when implemented in the amusement park setting, the visualization device 12 may be physically coupled to (e.g., via a tether 28) a structure (e.g., a ride vehicle 30 of the amusement park ride) to block separation of the visualization device 12 from the structure and/or may be electronically coupled to (e.g., via the tether 28) a computing system (e.g., a computing system integrated with the ride vehicle 30) to facilitate operation of the visualization device 12 (e.g., display of the virtual features 24).

Figure 2:
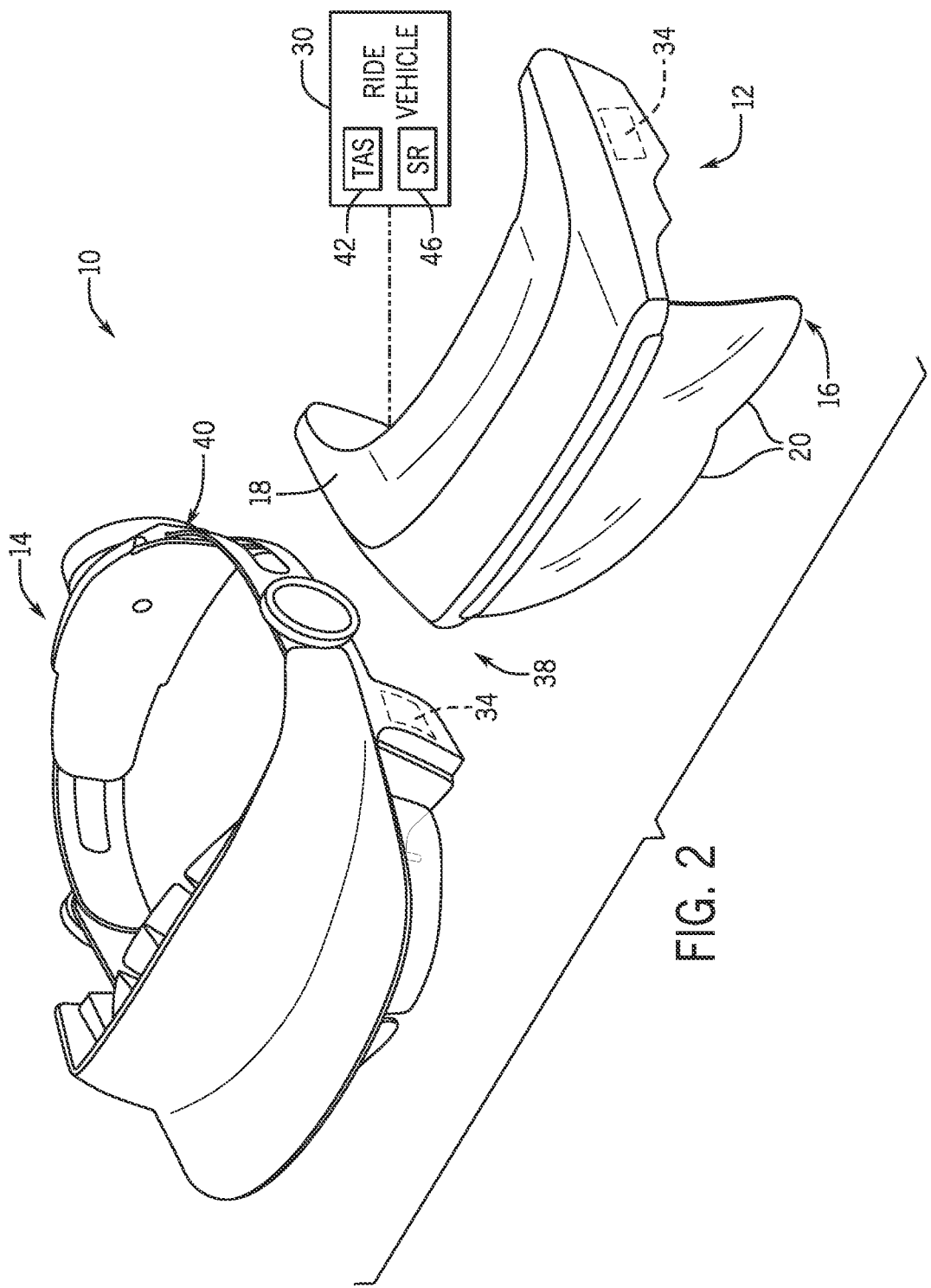
FIG. 2 is a perspective view of the visualization device and the interface device of FIG. 1 in a detached configuration, in accordance with present embodiments.

As discussed in detail below, the visualization device 12 is removably coupleable (e.g., toollessly coupleable; coupleable without tools; coupled without threaded fasteners, such as bolts; separable without tools and without breaking the components of the visualization device 12 or the interface device 14) to the interface device 14 via a coupling system, such as an electromagnetic coupling system 34. For example, the electromagnetic coupling system 34 may be integrated with the visualization device 12 and the interface device 14. The electromagnetic coupling system 34 enables the visualization device 12 to quickly transition between an engaged configuration 36 (e.g., attached configuration), in which the visualization device 12 is coupled to the interface device 14, and a detached configuration 38 (see, e.g., FIG. 2), in which the visualization device 12 is decoupled (e.g., separated) from the interface device 14.

The interface device 14 is configured to be affixed to a head of the user and, thus, enable the user to comfortably wear the visualization device 12 throughout various attractions or while traversing certain amusement park environments. For example, the interface device 14 may include a head strap assembly 40 that is configured to span about a circumference of the head of the user and configured to be tightened (e.g., constricted) on the head of the user. In this manner, the head strap assembly 40 facilitates affixing the interface device 14 to the head of the user, such that the interface device 14 may be utilized in conjunction with the electromagnetic coupling system 34 to retain the visualization device 12 on the user (e.g., when the visualization device 12 is in the engaged configuration 36). It should be understood that the visualization device 12 may have a size and weight that enables the visualization device 12 to be comfortably worn (e.g., supported by) by the user. As used herein, the visualization device 12 and the interface device 14, when transitioned to the engaged configuration 36 via the electromagnetic coupling system 34 or via another suitable coupling system, may be collectively referred to as a "wearable visualization assembly 44." Indeed, it should be appreciated that, in other embodiments, the electromagnetic coupling system 34 may be replaced with any other suitable coupling system (e.g., mechanical actuators, movable linkages) configured to facilitate transitioning the visualization device 12 and the interface device 14 between the detached configuration 38 and the engaged configuration 36. Moreover, it should be appreciated that, in further embodiments, the visualization device 12 and the interface device 14 may be integrated with one another (e.g., non-separable; carried together throughout the amusement park by the user or remain together at the attraction, such as on the ride vehicle, for use by multiple guests over multiple ride cycles) and collectively form the wearable visualization assembly 44.

In the illustrated embodiment of FIG. 1, the AR/VR system 10 includes a tether actuation system 42 that couples the tether 28 to the ride vehicle 30 or to another suitable structure (e.g., a wall of a room, a seat in a theatre). As discussed in detail below, the tether actuation system 42 is operable to selectively permit slack in and/or extension of the tether 28, such as while the user wears the wearable visualization assembly 44 during a particular ride stage of an attraction (e.g., an attraction having the ride vehicle 30). In this manner, the tether actuation system 42 may ensure that an extension length of the tether 28 is sufficient to enable the user to look around (e.g., move their head) while wearing the wearable visualization assembly 44 during the ride stage, substantially without restriction from the tether 28. Upon receiving an indication that the wearable visualization assembly 44 detaches from the user during the ride stage of the attraction, the tether actuation system 42 may selectively retrieve the tether 28 (e.g., to decrease the extension length of the tether 28) to transition the wearable visualization assembly 44 to a storage configuration on or within a storage receptacle 46 of the ride vehicle 30. To this end, the tether actuation system 42 may restrict movement of the wearable visualization assembly 44 upon detachment of the wearable visualization assembly 44 from the user, such that the wearable visualization assembly 44 does not undesirably move about the ride vehicle 30 (e.g., within a cabin of the ride vehicle 30) during a remainder of the ride stage. For clarity, as used herein, the "extension length" of the tether 28 may refer to a length of the tether 28 extending between a component of the tether actuation system 42 and a portion of the tether 28 coupled to the visualization device 12.

Figure 3:
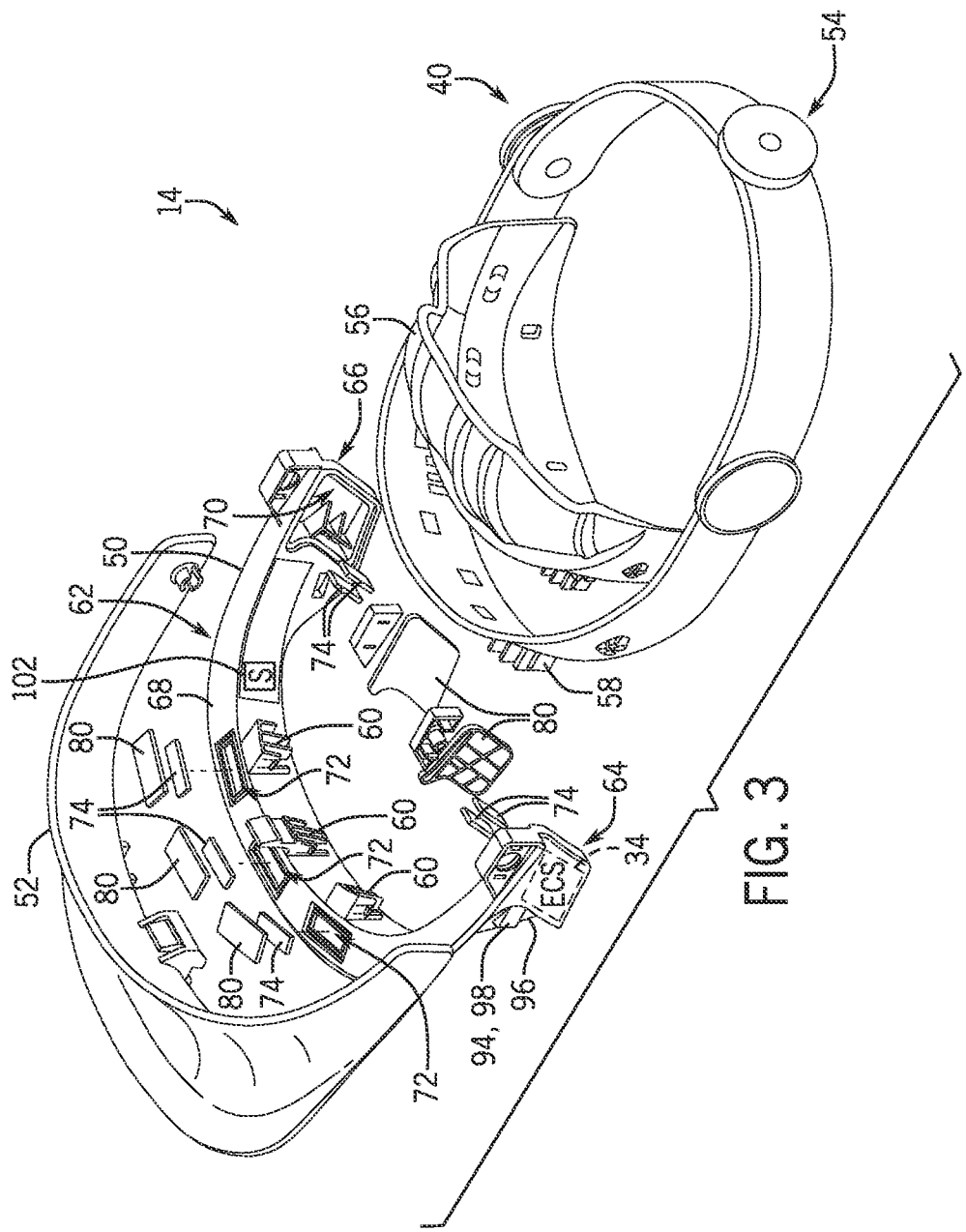
FIG. 3 is a partial exploded view of the interface device of FIG. 1, in accordance with present embodiments.

To better illustrate the interface device 14 and to facilitate the following discussion, FIG. 3 is a partial exploded view of an embodiment of the interface device 14. As shown in the illustrated embodiment, the interface device 14 includes an interface frame 50 and a visor 52 that may be coupled to the interface frame 50. The head strap assembly 40 may include an adjustment assembly 54 for adjusting an inner circumference of the head strap assembly 40 to accommodate head parameters (e.g., head sizes, head shapes, hair styles) of a variety of users to facilitate coupling the interface device 14 to the respective heads of the users. In an embodiment, the head strap assembly 40 includes a mask 56 that is configured to contact a forehead of the head of the user to facilitate alignment and/or securement of the interface device 14 to the head of the user. The head strap assembly 40 includes one or more first attachment features 58 configured to engage with respective second attachment features 60 of the interface frame 50. As such, engagement of the first and second attachment features 58, 60 enables the head strap assembly 40 to be coupled to the interface frame 50.

In the illustrated embodiment, the interface frame 50 includes a body portion 62 having a first peripheral end 64 (e.g., end portion; lateral portion), a second peripheral end 66 (e.g., end portion; lateral portion) opposite to the first peripheral end 64, and a lip 68 extending between the first and second peripheral ends 64, 66. The body portion 62 may include peripheral cavities 70 or pockets that are formed within the first and second peripheral ends 64, 66 and/or one or more cavities 72 or pockets that are formed within the lip 68. In an embodiment, the electromagnetic coupling system 34 includes one or more reaction plates 74 (e.g., one or more reaction materials), which may be configured to be disposed within respective cavities 70, 72. As discussed in detail below, the reaction plates 74 are configured to magnetically couple with corresponding electromagnets included in the visualization device 12 to facilitate removable coupling of the interface device 14 to the visualization device 12. The reaction plates 74 may include any suitable ferrous material or materials (e.g., one or more iron plates, one or more metallic plates). Additionally or alternatively, the reaction plates 74 may include electromagnets or permanent magnets (e.g., neodymium magnets). In an embodiment, respective caps 80 may be disposed over the reaction plates 74 to encapsulate the reaction plates 74 within the respective cavities 70, 72. It should be appreciated that the cavities 70, 72 may be formed within any suitable portion of the interface device 14 and/or the reaction plates 74 may be coupled to and/or integrated with any suitable portion of the interface device 14.

In an embodiment, the body portion 62 includes a plurality of support ribs 94 that protrude from an outer surface 96 of the body portion 62. Particularly, the body portion 62 may include a first support rib 98 that extends from the first peripheral end 64 and a second support rib that extends from the second peripheral end 66. As discussed in detail below, the support ribs 94 are configured to engage with corresponding support grooves 100 (see, e.g., FIG. 4) formed within the housing 18 of the visualization device 12 to facilitate coupling of the visualization device 12 to the interface frame 50 of the interface device 14. It should be appreciated that, in other embodiments, the electromagnetic coupling system 34 may not include the support ribs 94 and the support grooves 100.

In an embodiment, the interface device 14 includes one or more sensors 102 that, as discussed in detail below, may be communicatively coupled to a controller 104 (see, e.g., FIG. 4) of the visualization device 12 at least while the interface device 14 is coupled to the visualization device 12. The one or more sensors 102 may be configured to provide the controller 104 with feedback indicative of whether the interface device 14 is equipped on or coupled to the head of the user (e.g., in contact with or separated from the head of the user). As discussed in detail below, the controller 104 may utilize the feedback received by the one or more sensors 102 to determine whether the wearable visualization assembly 44 is in an attached configuration on the head of the user or is detached from the user. Although the one or more sensors 102 are shown as being coupled to the interface frame 50 in the illustrated embodiment of FIG. 3, in other embodiments, the one or more sensors 102 may be coupled to any other suitable component or components of the interface device 14. For example, the one or more sensors 102 may be coupled to a portion of the head strap assembly 40 (see, e.g., FIG. 5), the mask 56, the visor 52, and/or another suitable component or region of the interface device 14.

Figure 4:
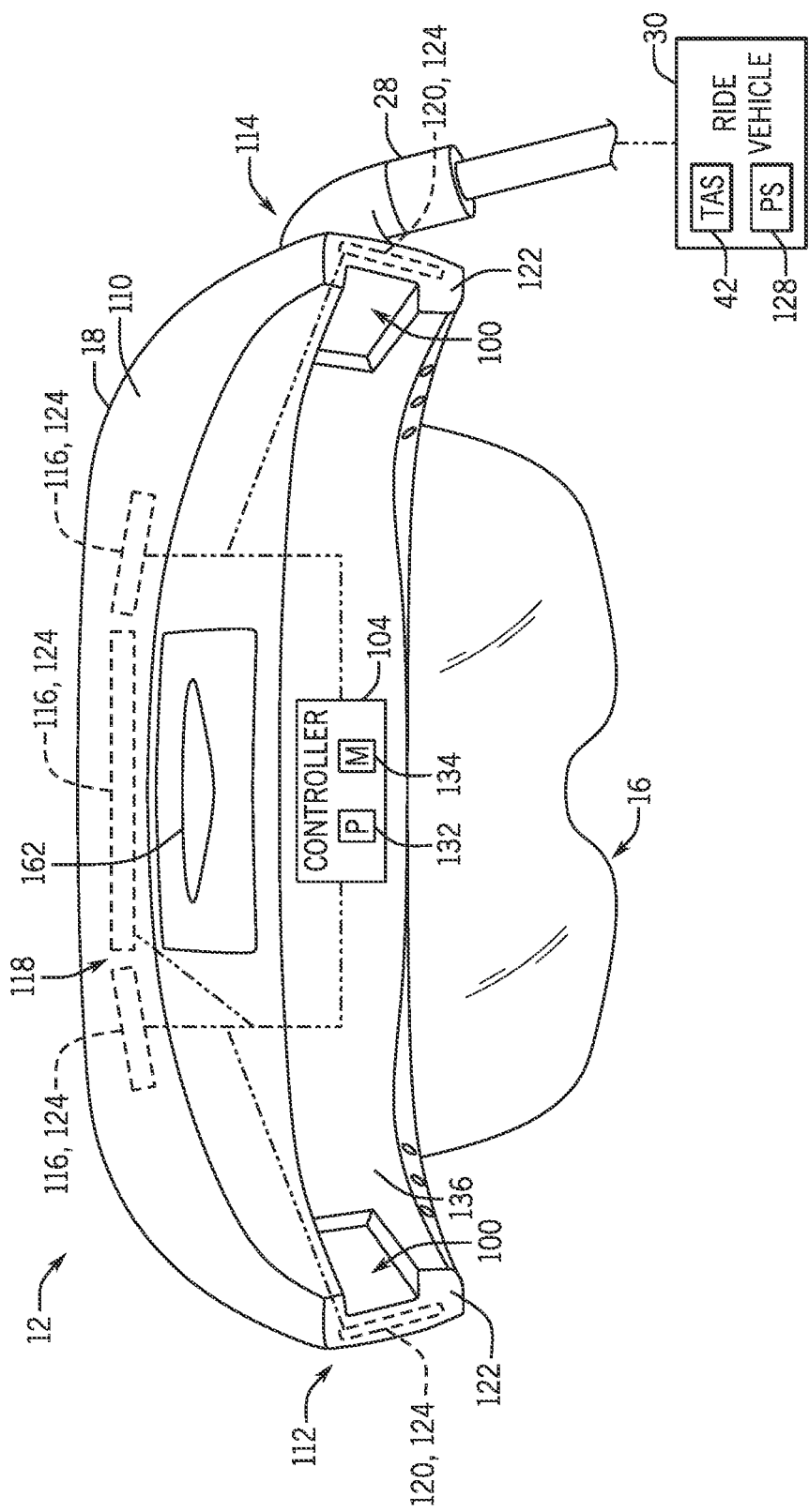
FIG. 4 is a rear view of the visualization device of FIG. 1, in accordance with present embodiments.

FIG. 4 is a rear view of an embodiment of the visualization device 12. In the illustrated embodiment, the housing 18 includes a panel 110 that extends between a first peripheral portion 112 (e.g., end portion; lateral portion) and a second peripheral portion 114 (e.g., end portion; lateral portion) of the housing 18. The electromagnetic coupling system 34 may include one or more first electromagnets 116 that are positioned near a surface 118 of the panel 110 and/or one or more second electromagnets 120 that are positioned near respective surfaces 122 of the first and second peripheral portions 112, 114. For example, in an embodiment, the first electromagnets 116 may be hermetically sealed within respective cavities formed within the surface 118, while the second electromagnets 120 may be hermetically sealed within respective cavities formed within the surfaces 122. In other embodiments, the first and second electromagnets 116, 120 (collectively referred to herein as electromagnets 124) may be positioned within an interior of the housing 18 and disposed adjacent the surface 118 and the surfaces 122, respectively. In any case, as discussed in detail below, the electromagnets 124 are configured to selectively attract corresponding reaction plates 74 (see, e.g., FIG. 3) of the interface device 14 to facilitate magnetically coupling the visualization device 12 to the interface device 14. In an embodiment, certain of the electromagnets 124 may be replaced with permanent magnets or a suitable reaction material (e.g., metallic plate).

In an embodiment, the tether 28 may electrically couple the electromagnets 124, the controller 104, and/or any other suitable component of the visualization device 12 to a power supply 128. In an embodiment, the power supply 128 may be coupled to and configured to travel with the ride vehicle 30 (e.g., along a path of the attraction). The controller 104 is configured to operate the electromagnetic coupling system 34 (see, e.g., FIG. 1), the tether actuation system 42, and/or any other suitable components of the AR/VR system 10 in accordance with the techniques discussed herein. The controller 104 includes a processor 132 and a memory device 134. The processor 132 may include a microprocessor, which may execute software controlling the visualization device 12, the electromagnetic coupling system 34, the tether actuation system 42, and/or any other suitable components of the AR/VR system 10 and/or components of the attraction having the AR/VR system 10. The processor 132 may include multiple microprocessors, one or more "general-purpose" microprocessors, one or more special-purpose microprocessors, and/or one or more application specific integrated circuits (ASICs), or some combination thereof. For example, the processor 132 may include one or more reduced instruction set computer (RISC) processors. The memory device 134 may include volatile memory, such as random access memory (RAM), and/or nonvolatile memory, such as read-only memory (ROM). The memory device 134 may store information, such as control software, look up tables, configuration data, communication protocols, or the like.

For example, the memory device 134 may store processor-executable instructions including firmware or software for the processor 132 to execute, such as instructions for controlling components of the electromagnetic coupling system 34, components of the tether actuation system 42, components of the visualization device 12, and/or any suitable components of the attraction having the AR/VR system 10. In an embodiment, the memory device 134 is a tangible, non-transitory, machine-readable media that may store machine-readable instructions for the processor 132 to execute. The memory device 134 may include ROM, flash memory, hard drives, any other suitable optical, magnetic, or solid-state storage media, or a combination thereof.

In the illustrated embodiment of FIG. 4, the support grooves 100 that are formed within the peripheral portions 112, 114 of the housing 18 extend along at least a portion of a lateral surface 136 of the housing 18. For example, the support grooves 100 may extend from the surfaces 122 (e.g., distal ends of the housing 18) generally toward the electronic eyeglasses 16. As discussed below, the support grooves 100 may be configured to engage with corresponding ones of the support ribs 94 to facilitate removably coupling the visualization device 12 to the interface device 14.

Figure 5:
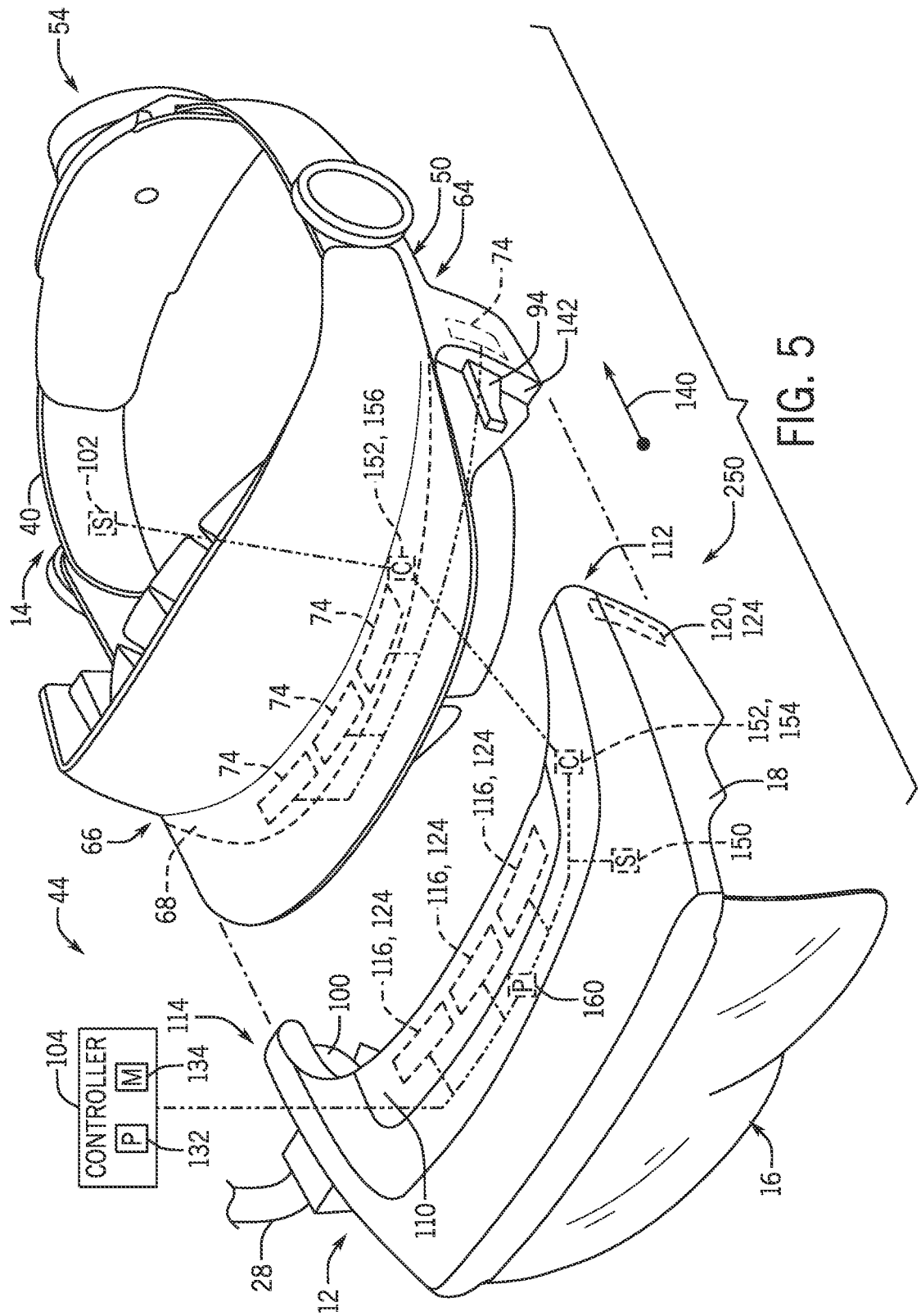
FIG. 5 is a perspective view of the visualization device and the interface device of FIG. 1 in the detached configuration and aligned with one another to facilitate coupling the visualization device to the interface device, in accordance with present embodiments.

FIG. 5 is a perspective view of an embodiment of the visualization device 12 and the interface device 14. To couple the visualization device 12 to the interface device 14, the user may (e.g., while holding the interface device 14 in the user's hands and while the interface device 14 is separated from the user's head; while wearing the interface device 14 on the user's head) translate the visualization device 12 toward the interface device 14 in a direction 140 to enable the support ribs 94 of the interface device 14 to engage with the corresponding support grooves 100 of the visualization device 12. The user may translate the visualization device 12 along the support ribs 94 (e.g., in the direction 140) until the surfaces 122 (see, e.g., FIG. 4) of the housing 18 abut corresponding receiving faces 142 of the first and second peripheral ends 64, 66 of the interface frame 50. As such, the second electromagnets 120 may be aligned with and positioned adjacent to the corresponding reaction plates 74 of the interface frame 50. Additionally or alternatively, at least a portion of the panel 110 of the visualization device 12 may be configured to translate beneath and along the lip 68 of the interface frame 50 to enable the first electromagnets 116 of the visualization device 12 to align with the corresponding reaction plates 74. The controller 104 may selectively supply electrical power (e.g., via the power supply 128; see, e.g., FIG. 4) to the electromagnets 124 to energize the electromagnets 124 to magnetically couple the electromagnets 124 to the reaction plates 74. As such, the controller 104 may facilitate transitioning the visualization device 12 and the interface device 14 to, and retaining the visualization device 12 and the interface device 14 in, the engaged configuration 36. In an embodiment, the controller 104 may sufficiently energize the electromagnets 124 to lock (e.g., retain) the visualization device 12 and the interface device 14 in the engaged configuration 36. In such a locked configuration of the visualization device 12, the magnetic coupling force between the electromagnets 124 and the reaction plates 74 may be sufficient to inhibit decoupling of the visualization device 12 from the interface device 14 (e.g., via guest input and/or accelerative forces that may be applied to the interface device 14 during operation of the AR/VR system 10). As noted above, any suitable type of coupling system may be utilized to inhibit decoupling the visualization device 12 from the interface device 14 (e.g., when coupled together and/or in coordination with the ride cycle).

In an embodiment, the controller 104 may be configured to determine that the visualization device 12 is coupled to the interface device 14 based on feedback received from one or more sensors 150 (e.g., a proximity sensor, an inertial measurement unit [IMU]) of the visualization device 12. For example, the controller 104 may determine that the visualization device 12 is coupled to the interface device 14 upon receiving feedback from the one or more sensors 150 indicating that a portion of the visualization device 12 (e.g., one of the surfaces 122; see, e.g., FIG. 4) is within a threshold distance of and/or within a threshold orientational range of a corresponding portion (e.g., one of the receiving faces 142) of the interface device 14.

It should be appreciated that, in an embodiment, the support grooves 100 and the support ribs 94 may be omitted from the AR/VR system 10. In such embodiments, the magnetic coupling force between the electromagnets 124 and the reaction plates 74 may be sufficient to support all of a weight of the visualization device 12 when the visualization device 12 is coupled to the interface device 14 and/or other structural features may be provided to share support of the weight of the visualization device 12 when the visualization device 12 is coupled to the interface device 14.

In an embodiment, the AR/VR system 10 includes a set of connectors 152 (e.g., electrical contacts) that facilitate communicatively and/or electrically coupling components of the interface device 14 to components of the visualization device 12. For example, the connectors 152 may include a first connector 154 that is electrically coupled to the one or more sensors 150 and the controller 104 and may include a second connector 156 that is electrically coupled to the one or more sensors 102. The first and second connectors 154, 156 may be configured to engage (e.g., contact) one another when the visualization device 12 is engaged with (e.g., coupled to) the interface device 14. To this end, the connectors 152 may facilitate transmission of electrical power and/or data signals between, for example, the one or more sensors 102, 150 and the controller 104.

As briefly discussed above, the controller 104 may utilize feedback received from the one or more sensors 102 to determine whether the interface device 14 is in an equipped or attached configuration on the head of the user. That is, the controller 104 may utilize the received sensor feedback to determine an attachment status of the interface device 14, and thus of the wearable visualization assembly 44, on the head of the user. For example, upon engagement of the connectors 154, 156 (e.g., such as when the visualization device 12 is transitioned to the engaged configuration 36 with the interface device 14), the controller 104 may receive feedback (e.g., data signals) from the one or more sensors 102. The one or more sensors 102 may include a heartbeat sensor (e.g., an optical sensor; a sensor system having a light emitting diode and corresponding detector) configured to detect a heartbeat of the user, a proximity sensor configured to detect the head of the user, and/or other suitable sensor(s) that is coupled to, for example, a strap or other segment of the head strap assembly 40. The heartbeat sensor and/or the proximity sensor may be configured to contact a portion of the head of the user and/or be positioned substantially adjacent to the head of the user when the interface device 14 is coupled to (e.g., equipped on) the head of the user. Thus, the controller 104 may determine that the wearable visualization assembly 44 is in the attached configuration on the user upon receiving feedback from the heartbeat sensor indicating that the heartbeat of the user is detected (which indicates that the heartbeat sensor is in contact with the head of the user) and/or upon receiving feedback from the proximity sensor indicating that the proximity sensor is within a threshold distance of the head of the user. Conversely, the controller 104 may determine that the wearable visualization assembly 44 is in the detached configuration (e.g., decoupled from the user) upon receiving feedback from the heartbeat sensor indicating that the heartbeat of the user is not detected (which indicates that the heartbeat sensor does not contact the head of the user) and/or upon receiving feedback from the proximity sensor indicating that the proximity sensor is not within the threshold distance of the head of the user.

It should be understood that, in other embodiments, the sensors 102, 150 may be configured to wirelessly communicate with the controller 104, such that the connectors 152 may be omitted from the AR/VR system 10. In such embodiments, the controller 104 may determine that the wearable visualization assembly 44 is in the attached configuration on the user upon receiving feedback from the one or more sensors 150 indicating that the visualization device 12 is in the engaged configuration with the interface device 14 and upon receiving feedback (e.g., wireless feedback) from the one or more sensors 102 that the interface device 14 is in contact with or within a threshold distance of the head of the user. Conversely, the controller 104 may determine that the wearable visualization assembly 44 is detached from the user upon receiving feedback from the one or more sensors 150 indicating that the visualization device 12 is in the engaged configuration with the interface device 14 and upon receiving feedback (e.g., wireless feedback) from the one or more sensors 102 that the interface device 14 is not in contact with or within the threshold distance of the head of the user.

Moreover, it should be appreciated that, in an embodiment, some of or all of the one or more sensors 102 may be coupled to the visualization device 12 instead of the interface device 14. As an example, in an embodiment, the one or more sensors 102 may include a proximity sensor 160 (e.g., optical sensor) that is coupled to the housing 18 of the visualization device 12. In an embodiment, an aperture may be formed within a portion (e.g., the interface frame 50) of the interface device 14 and aligned with the proximity sensor 160 such that, when the visualization device 12 is coupled to the interface device 14, the proximity sensor 160 may detect the head of the user through the aperture and without interference from the interface device 14. The proximity sensor 160 may provide the controller 104 with feedback indicative of a separation distance between a portion of the housing 18 and a portion of the head of the user (e.g., a forehead of the user). The controller 104 may determine that the wearable visualization assembly 44 is in the attached configuration on the user upon receiving feedback from the sensors 150 indicating that the visualization device 12 is in the engaged configuration with the interface device 14 and upon receiving feedback from the proximity sensor 160 indicating that the separation distance between the portion of the housing 18 and the portion of the head of the user is below a threshold distance. Conversely, the controller 104 may determine that the wearable visualization assembly 44 is detached from the user upon receiving feedback from the sensors 150 indicating that the visualization device 12 is in the engaged configuration with the interface device 14 and upon receiving feedback from the proximity sensor 160 indicating that the separation distance between the portion of the housing 18 and the portion of the head of the user meets or exceeds the threshold distance.

Additionally or alternatively, the one or more sensors 102 may include a camera 162 (see e.g., FIG. 4) or a plurality of cameras that may be coupled to the housing 18 of the visualization device 12. The camera 162 may be located/oriented on the housing 18 such that, when the visualization device 12 is in the engaged configuration 36 on the interface device 14 and the interface device 14 is appropriately coupled to the head of the user, the camera 162 is directed toward a portion (e.g., face, forehead) of the head of the user. In an embodiment, an aperture may be formed within a portion (e.g., the interface frame 50) of the interface device 14 and aligned with a line of sight of the camera 162 such that, when the visualization device 12 is coupled to the interface device 14, the camera 162 may acquire image data through the aperture and without interference from the interface device 14 (e.g., the interface device 14 does not obscure the portion of the head of the guest being imaged by the camera 162). The controller 104 may, based on image data received from the camera 162, determine a separation distance between, for example, a lens of the camera 162 and the portion of the head of the user. The controller 104 may determine that the wearable visualization assembly 44 is in the attached configuration on the user upon receiving feedback from the sensors 150 indicating that the visualization device 12 is in the engaged configuration with the interface device 14 and upon determining (e.g., based on analysis of the image data) that the separation distance between the lens of the camera 162 and the portion of the head of the user is below a threshold distance. Conversely, the controller 104 may determine that the wearable visualization assembly 44 is detached from the user upon receiving feedback from the sensors 150 indicating that the visualization device 12 is in the engaged configuration with the interface device 14 and upon determining (e.g., based on analysis of the image data) that the separation distance between lens of the camera 162 and the portion of the head of the user meets or exceeds the threshold distance.

With the foregoing examples in mind, it should be appreciated that the visualization device 12 and the interface device 14 may have any of a variety of components and use any of a variety of techniques to detect whether the visualization device 12 and the interface device 14 are in the engaged configuration 36 to form the wearable visualization assembly 44. It should also be appreciated that the visualization device 12 and the interface 14 may have any of a variety of components and use any of a variety of techniques to detect whether the visualization device 12 (or the wearable visualization assembly 44 when the visualization device 12 and the interface device 14 are in the engaged configuration 36) is in the attached configuration on the head of the user. The tether actuation system 42 may be controlled based on multiple inputs, such as whether the visualization device 12 and the interface device 14 are in the engaged configuration 36, whether the visualization device 12 (or the wearable visualization assembly 44 when the visualization device 12 and the interface device 14 are in the engaged configuration 36) is in the attached configuration, and/or the ride cycle (e.g., based on the ride stage). The tether actuation system 42 may move the visualization device 12 separately from the interface device 14 (when in the detached configuration) or with the interface device 14 (when in the engaged configuration). Therefore, it should be appreciated that examples herein that relate to retrieval of the visualization device 12 with the interface device 14 (e.g., movement of the wearable visualization assembly 44) may instead include retrieval of the visualization device 12 on its own. Furthermore, it should be appreciated that any of a variety of coupling systems may be utilized to couple the visualization device 12 and the interface device 14 to one another, and some such coupling systems may be controlled in coordination with the tether actuation system 42 and/or the ride cycle (e.g., based on the ride stage).

Figure 6:
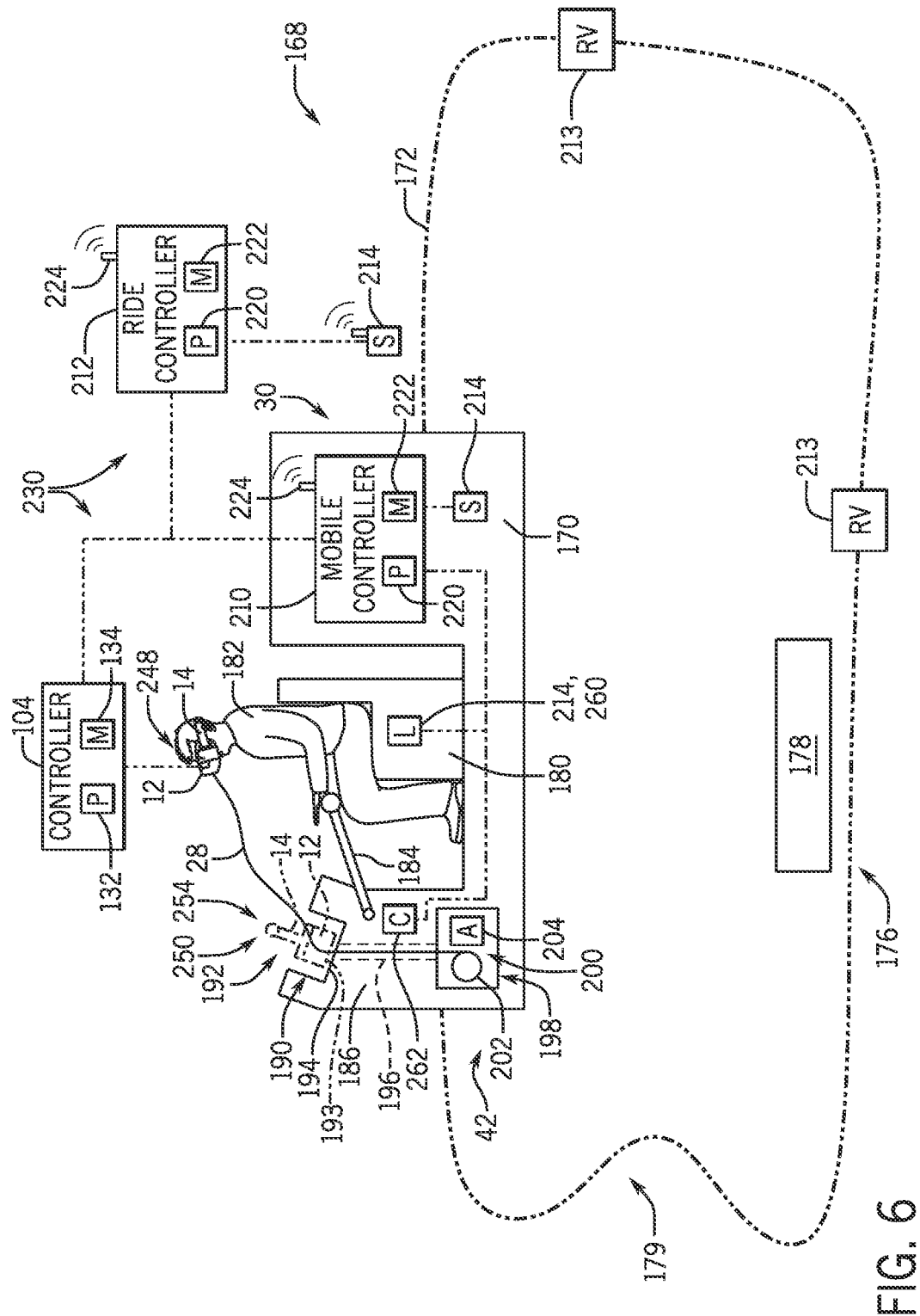
FIG. 6 is a schematic of an attraction utilizing the AR/VR system of FIG. 1, in accordance with present embodiments.

FIG. 6 is a schematic of an embodiment of an attraction 168 that includes the AR/VR system 10. In the illustrated embodiment, the ride vehicle 30 includes a chassis 170 or a base structure that may be configured to travel along a path 172 of the attraction 168 (although the AR/VR system 10 may be utilized with ride vehicles that move without traveling along a path or in any of a variety of other types of attractions). The path 172 may include a loading/unloading section 176 extending along a loading/unloading platform 178 of the attraction 168 and an amusement section 179 extending along a remaining portion of the path 172. A seat 180 or other structure is coupled to the chassis 170 and configured to support a guest 182 (e.g., a user of the AR/VR system 10) during a ride cycle of the attraction 168. In an embodiment, a lap bar 184 or other restraint may be coupled to, for example, a support structure 186 of the chassis 170. The lap bar 184 may be configured to translate, rotate, or otherwise move between a disengaged position in which the lap bar 184 is positioned away from the guest 182, and an engaged configuration in which the lap bar 184 is configured to secure and/or restrain the guest 182 within the seat 180.

In an embodiment, a storage receptacle 190 (e.g., the storage receptacle 46 of FIGS. 1 and 2) is formed within the support structure 186 and configured to receive the visualization device 12. For example, the storage receptacle 190 may be sized and shaped such that, when the visualization device 12 is disposed in a storage configuration 192 within the storage receptacle 190, at least a portion of the visualization device 12 (e.g., a contact surface 193 of the visualization device 12) engages with (e.g., contacts) a receiving surface 194 (e.g., a lower surface) of the storage receptacle 190. Although the storage receptacle 190 is shown as being formed in the support structure 186 in the illustrated embodiment of FIG. 6, it should be appreciated that, in other embodiments, the storage receptacle may be formed within any other suitable portion of the ride vehicle 30. As an example, the storage receptacle 190 may be formed in a portion of the lap bar 184, in a portion of the ride vehicle 30 that is vertically above (e.g., with respect to gravity) the guest 182, in a roof structure or roll cage of the ride vehicle 30, or in any other suitable portion of the ride vehicle 30.

In the illustrated embodiment, a passage 196 extends from an opening formed on the receiving surface 194 of the storage receptacle 190 to a retraction assembly 198 of the tether actuation system 42. The tether 28 is configured to extend through the passage 196 and between the visualization device 12 and a retraction device 200 of the retraction assembly 198. The retraction device 200 may include any suitable mechanism and/or actuator that is configured to selectively retrieve (e.g., draw in, spool in) the tether 28 to reduce an extension length of the tether 28 and to selectively enable release (e.g., unspooling) of the tether 28 to permit increase in the extension length of the tether 28. As a non-limiting example, the retraction device 200 may include a drum 202 that is driven by an actuator 204 and configured to selectively spool the tether 28 about an exterior of the drum 202 to decrease the extension length of the tether 28 and to selectively enable unwinding (e.g., unspooling) of the tether 28 from the drum 202 to permit increase in the extension length of the tether 28 (e.g., such as when the guest 182 grabs and pulls on the visualization device 12 in a direction extending away from the retraction assembly 198). As discussed in detail below, the tether actuation system 42 is operable to selectively retrieve the tether 28 or enable release of the tether 28 based on feedback indicative of a current configuration status and/or attachment status of the visualization device 12 (e.g., engaged configuration and/or attached configuration) and/or in coordination with the ride cycle (e.g., based on operating parameters of the attraction 168 and/or feedback indicative of the ride cycle stage [e.g., loading stage, unloading stage, amusement stage] being executed by the ride vehicle 30).

In an embodiment, the ride vehicle 30 may include a mobile controller 210 that is coupled to the ride vehicle 30 and configured to travel with the ride vehicle 30 along the path 172. Additionally or alternatively, the attraction 168 may include a ride controller 212 that is separate from the ride vehicle 30 and disposed along a portion of the path 172. The mobile controller 210 and/or the ride controller 212 may monitor and/or control certain aspects of the attraction 168, such as a position of the ride vehicle 30 and/or respective positions of other ride vehicles 213 along the path 172. The controllers 210, 212 may be communicatively coupled to one or more sensors 214 (e.g., global positioning system [GPS] sensors, inertial measurement unit [IMU] sensors, proximity sensors) coupled to the ride vehicle 30 and/or disposed along the path 172 and configured to receive feedback from the sensors 214 indicative of a position of the ride vehicle 30 along the path 172, a velocity of the ride vehicle 30, an acceleration of the ride vehicle 30, and/or another suitable parameter of the ride vehicle 30. In an embodiment, the controllers 210 and/or 212 may determine which ride stage of the ride cycle (e.g., unloading stage, loading stage, amusement stage) is being executed by the ride vehicle 30 based on feedback, such as feedback from the one or more sensors 214 and/or based on other inputs (e.g., timing signals; stored ride cycle data). The controllers 210, 212, may utilize feedback from the one or more sensors 214. In some embodiments, the mobile controller 210 and/or the ride controller 212 may be communicatively coupled to the visualization device 12, the electromagnetic coupling system 34, and/or the tether actuation system 42. To this end, the controllers 210 and/or 212 may be used in addition to, or in lieu of, the controller 104 to adjust operation of the visualization device 12, the electromagnetic coupling system 34, and/or the tether actuation system 42 in accordance with the techniques discussed herein.

The mobile controller 210 and the ride controller 212 each include a processor 220, a memory 222, and a communication component 224 (e.g., for facilitating communication between the controllers 104, 210, and/or 212). The processors 220 may include multiple microprocessors, one or more "general-purpose" microprocessors, one or more special-purpose microprocessors, and/or one or more application specific integrated circuits (ASICs), or some combination thereof. For example, the processors 220 may include one or more reduced instruction set computer (RISC) processors. The memory devices 222 may include volatile memory, such as random access memory (RAM), and/or nonvolatile memory, such as read-only memory (ROM). In an embodiment, the memory devices 222 are a tangible, non-transitory, machine-readable media that may store machine-readable instructions for the processors 220 to execute to control aspects of the attraction 168.

Throughout the following discussion, the controller 104, the mobile controller 210, and/or the ride controller 212 may be collectively referred to as a control system 230. Accordingly, it should be understood that operations discussed herein as being performed by the control system 230 may refer to operations that are performed by one or more of the controller 104, the mobile controller 210, the ride controller 212, or a combination thereof. Furthermore, it should be appreciated that the techniques may be distributed between the controller 104, the mobile controller 210, the ride controller 212, and/or one or more other processing devices in any suitable manner.

Figure 7:
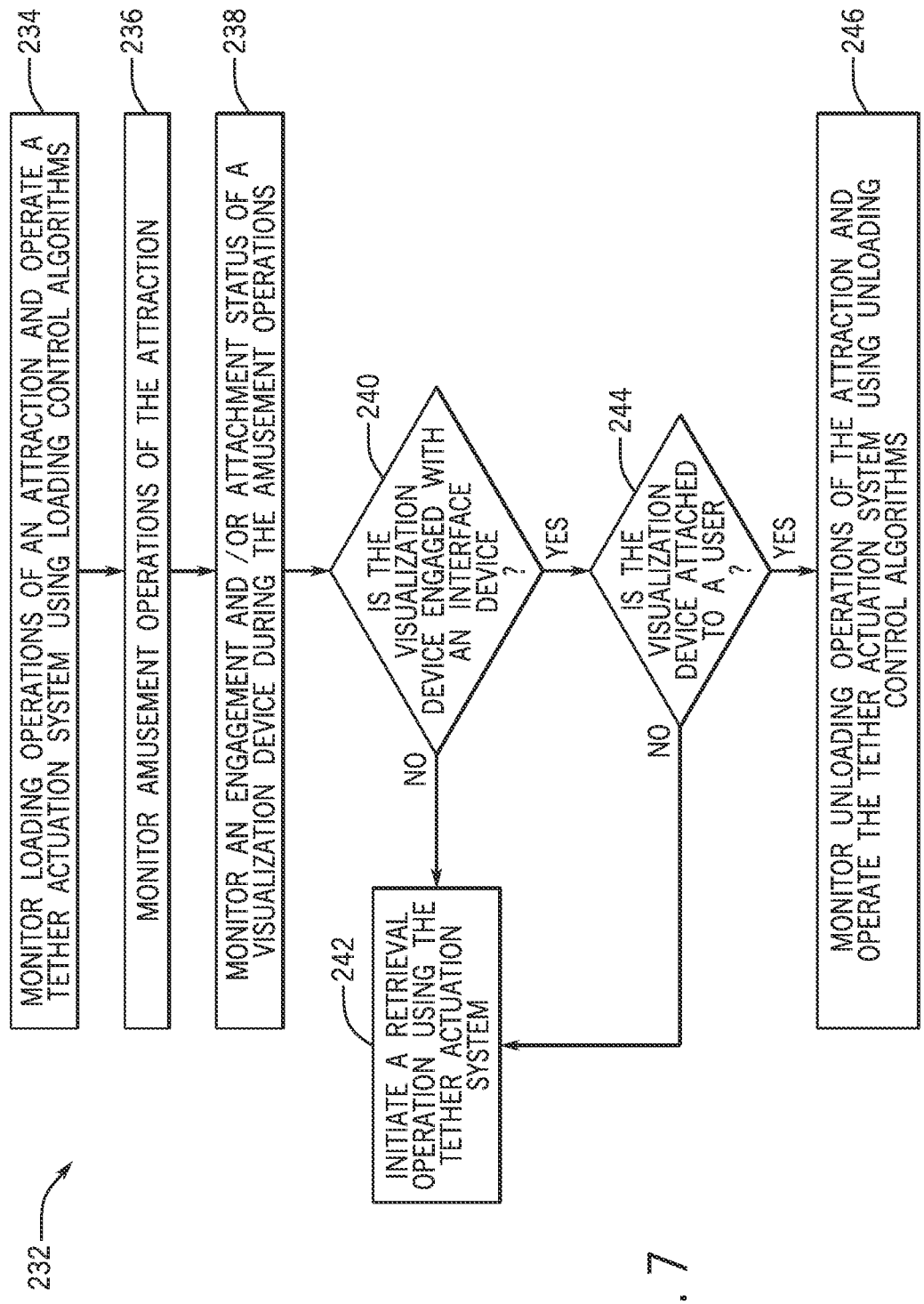
FIG. 7 is a flow diagram of a process for operating a tether actuation system of the AR/VR system of FIG. 1, in accordance with present embodiments.

FIG. 7 is a flow diagram of an embodiment of a process 232 for operating the tether actuation system 42 in a coordinated manner with the ride cycle of the attraction 168 and/or based on sensor feedback indicative of a current configuration or position of the visualization device 12 (e.g., engaged configuration and/or attached configuration). The following discussion continues with concurrent reference to FIGS. 6 and 7. The process 232 may be executed by the control system 230. The process 232 may include monitoring a loading operation being executed by the ride vehicle 30 during a loading stage of the ride cycle and operating the tether actuation system 42 based on associated control algorithms, as indicated by block 234.

For example, during a loading stage of the ride cycle, the control system 230 may control the tether actuation system 42 in accordance with loading control algorithms (e.g., control protocols or instructions). When operating in accordance with the loading control algorithms, the control system 230 may instruct the tether actuation system 42 to enable release of the tether 28 (e.g., from the retraction assembly 198), such as when a force (e.g., a tensile force) is applied to the tether 28. As an example, the control system 230 may instruct the actuator 204 to enable free-spooling of the drum 202 upon application of the tensile force to the tether 28. Accordingly, when the guest 182 boards (e.g., enters) the ride vehicle 30 during the loading operation (e.g., while wearing the interface device 14 on the head of the guest 182; without having the visualization device 12 equipped to the interface device 14), the guest 182 may grab the visualization device 12 (e.g., which may be positioned within the storage receptacle 190), pull the visualization device 12 toward the head of the guest 182 (e.g., to increase the extension length of the tether 28), and equip the visualization device 12 on the interface device 14 worn by the guest 182. To this end, the guest 182 may pull on the visualization device 12 and/or the tether 28 to adjust the extension length of the tether 28 to a length that enables the guest 182 to move the visualization device 12 toward the interface device 14 worn on the head of the guest 182. As noted above, in an embodiment, upon engagement of the visualization device 12 with the interface device 14, the control system 230 may instruct the electromagnetic coupling system 34 to lock the visualization device 12 in the engaged configuration 36 with the interface device 14. The transition to the engaged configuration 36 and/or being locked to the interface device 14 may be detected via the one or more sensors 150 (see, e.g., FIG. 5), for example.

In an embodiment, the drum 202 may be coupled to a spring-loading ratcheting mechanism that enables release (e.g., unspooling) of the tether 28 upon application of the tensile force to the tether 28 by the guest 182, while blocking the drum 202 from retrieving (e.g., spooling in) the tether 28 upon removal of the tensile force. As such, the guest 182 may adjust the extension length of the tether 28 to a length that enables the guest 182 to comfortably move their head, while having the visualization device 12 equipped on the interface device 14, substantially without interference (e.g., restriction) from the tether 28. Thus, during the loading stage, the tether actuation system 42 may operate in a passive configuration in which the retraction assembly 198 may release any tension that may be applied to the tether 28 and enable release of the tether 28 (e.g., enable un-spooling of the tether 28).

The process 232 may include monitoring an amusement operation being executed by the ride vehicle 30 during an amusement stage of the ride cycle and operating the tether actuation system 42 based on associated control algorithms, as indicated by block 236. The amusement stage may occur between the loading stage and an unloading stage of the ride cycle and may include a time period during which the ride vehicle 30 travels along the amusement section 179 of the path 172. The control system 230 may determine that the ride vehicle 30 is executing the amusement stage based on sensor feedback (e.g., from the one or more sensors 214) indicating a position of the ride vehicle 30 along the path 172 and/or based on an indication provided by ride control algorithms that may at least partially control operation of the attraction 168 and execute on the control system 230.

As discussed above, in some cases, the guest 182 may purposefully or inadvertently decouple the wearable visualization assembly 44 from the head of the guest 182 and/or decouple the visualization device 12 from the interface device 14 during the amusement stage of the ride cycle (e.g., if not locked together). Moreover, the wearable visualization assembly 44 may otherwise become dislodged (e.g., decoupled) from the head of the guest 182 and/or the visualization device 12 may disengage from the interface device 14 (e.g., if not locked together) during the amusement stage (e.g., due to forces applied to the visualization device 12 and/or the interface device 14 as the ride vehicle 30 travels along the path 172). Accordingly, during the amusement stage of the ride cycle, the control system 230 may monitor an engagement status of the visualization device 12 with the interface device 14 and/or an attachment status of the visualization device 12 (or the wearable visualization assembly 44 when the visualization device 12 is coupled to the interface device 14) on the head of the guest 182, as indicated by block 238. In response to determining that the visualization device 12 is not engaged with the interface device 14, the tether actuation system 42 may be controlled to initiate a retrieval operation. Additionally or alternatively, in response to determining that the visualization device 12 is not attached to the head of the user, the tether actuation system 42 may be controlled to initiate the retrieval operation.

For example, in accordance with the techniques discussed above, the control system 230 may utilize feedback (e.g., from the one or more sensors 150) to determine whether the visualization device 12 is in the engaged configuration 36 with the interface device 14, as indicated by block 240. Upon detecting that the visualization device 12 is disengaged from the interface device 14 during the amusement stage (e.g., transitions to the detached configuration 38), the control system 230 may instruct the tether actuation system 42 to initiate the retrieval operation to retrieve (e.g., retract) the tether 28 to direct the visualization device 12 toward and into the storage receptacle 190, as indicated by block 242. For example, the control system 230 may instruct the drum 202 to spool in the tether 28 until the contact surface 193 of the visualization device 12 engages (e.g., contacts) the receiving surface 194 of the storage receptacle 190. As such, the control system 230 may transition the visualization device 12 to the storage configuration 192 within the storage receptacle 190. A sensor (e.g., one of the one or more sensors 150) may detect and provide feedback indicative of the presence of the visualization device 12 within the storage receptacle 190.

In an embodiment, upon determining that the visualization device 12 is engaged with the interface device 14, the control system 230 may utilize feedback (e.g., from the sensors 102, 150, and/or 160 and/or from the camera 162) to determine whether the visualization device 12 is attached to the head of the guest 182 (e.g., equipped on the head of the guest 182) or detached from the head of the guest 182, as indicated by block 244. Because the visualization device 12 is coupled to the interface device 14 in the engaged configuration 36, the control system 230 may determine the attachment status of the visualization device 12 (and of the wearable visualization assembly 44) based on the attachment status of the interface device 14. For example, upon receiving feedback (e.g., from the one or more sensors 150) that the visualization device 12 is in the engaged configuration 36 with the interface device 14 and receiving feedback (e.g., from the sensors 102 and/or 160; and/or the camera 162) that the interface device 14 is coupled to the head of the guest 182, the control system 230 may determine that the wearable visualization assembly 44 is in an attached configuration 248 (see, e.g., FIG. 6) on the head of the guest 182, in which the wearable visualization assembly 44 (and the visualization device 12) is coupled to the head of the guest 182. Conversely, upon receiving feedback (e.g., from the sensors 150) that the visualization device 12 is in the engaged configuration 36 with the interface device 14 and receiving feedback (e.g., from the sensors 102 and/or 160; and/or the camera 162) that the interface device 14 is decoupled from the head of the guest 182, the control system 230 may determine that the wearable visualization assembly 44 (and the visualization device 12) is in a detached configuration 250 (see, e.g., FIG. 4), in which the wearable visualization assembly 44 is decoupled from the head of the guest 182. Upon detecting that the wearable visualization assembly 44 decouples from the head of the guest 182 during the amusement stage (e.g., transitions to the detached configuration 250), the control system 230 may instruct the tether actuation system 42 to initiate the retrieval operation to retrieve (e.g., retract) the tether 28 to transition wearable visualization assembly 44 to a storage configuration 254 (see, e.g., FIG. 6) within the storage receptacle 190, as indicated by block 242.

In an embodiment, the control system 230 may instruct the tether actuation system 42 to apply a threshold tension to the tether 28 while the visualization device 12 is in the storage configuration 192 and/or while the wearable visualization assembly 44 is in the storage configuration 254. To this end, the control system 230 may ensure that the tether actuation system 42 drives the contact surface 193 of the visualization device 12 against the receiving surface 194 of the storage receptacle 190 throughout a remainder of the amusement stage, such that the visualization device 12 and/or the wearable visualization assembly 44 remains disposed within the storage receptacle 190 and does not move about the ride vehicle 30 (e.g., move relative to the ride vehicle 30) during the amusement stage, or until some designated time during the amusement stage at which the user may be permitted or instructed to reattach the wearable visualization assembly 44 to the head of the user.

Regardless of whether the retrieval operation is initiated during the amusement stage, the process 232 may include monitoring an unloading operation being executed by the ride vehicle 30 during an unloading stage of the ride cycle (e.g., that occurs upon completion of the amusement stage) and operating the tether actuation system 42 based on associated control algorithms, as indicated by block 246. During the unloading stage of the ride cycle, the tether actuation system 42 may be configured to initiate the retrieval operation (e.g., if the visualization device 12 is not already in the storage receptacle 190) in response to separation of the visualization device 12 from the interface device 14 and/or in response to detecting that the visualization device 12 is not in the storage configuration 190 by a threshold time after separation from the interface device 14 and/or in response to detecting tension on the tether 28 that is indicative of the visualization device 12 being improperly placed (e.g., no longer held by the user, but not in the storage configuration 190; hanging by the tether 28; supported on some surface, but not on the receiving surface 194). Thus, the tether actuation system 42 may operate to return the visualization device 12 to the storage configuration 190 during the unloading operation to protect the visualization device 12 and/or to clear space for the user to unload from the ride vehicle 30 and a next user to load onto the ride vehicle 30.

As noted above, the coupling system, such as the electromagnetic coupling system 34, may be operated in coordination with the ride cycle as well, such as to lock the visualization device 12 to the interface device 14 during the loading stage, to block separation of the visualization device 12 from the interface 14 during the amusement stage, and to unlock the visualization device 12 from the interface device 14 during the unloading stage.

In an embodiment, the control system 230 may, upon determining that the seat 180 of the ride vehicle 30 is vacant or unoccupied during initiation of the amusement stage of the ride cycle, instruct the tether actuation system 42 to apply the threshold tension to the tether 28 to ensure that the visualization device 12 (e.g., without the interface device 14) remains disposed within the storage receptacle 190 and positioned in the storage configuration 192 throughout the amusement stage. In an embodiment, the control system 230 may determine whether the seat 180 is vacant based on feedback from the one or more sensors 214 of the ride vehicle 30. For example, the one or more sensors 214 may include a weight sensor 260 (e.g., a load cell) disposed within the seat 180 and/or a vehicle camera 262 coupled to the support structure 186. The control system 230 may determine that the seat 180 is unoccupied upon receiving feedback from the weight sensor 260 indicating that a force (e.g., weight) applied to the seat 180 is below a threshold value and/or upon receiving and analyzing image data from the vehicle camera 262 (e.g., indicating absence of the guest 182 during initiation of the amusement stage). Additionally or alternatively, the control system 230 may receive feedback from an operator of the attraction 168 indicating that the seat 180 is unoccupied or may determine the vacancy of the seat 180 in any other suitable manner.

As set forth above, embodiments of the present disclosure may provide one or more technical effects useful for controlling positioning and securement of a visualization device, or both the visualization device and an interface device, within a ride vehicle of an attraction. Particularly, embodiments of the present disclose facilitate transitioning the visualization device, or both the visualization device and the interface device, to a storage configuration within a storage receptacle of the ride vehicle and retaining the visualization device and/or the interface device in the storage receptacle during various portions of a ride cycle of the attraction. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A retraction system for retracting a visualization device configured to present virtual imagery to a user, the retraction system comprising:
    a retraction assembly comprising an actuator and a tether, wherein a first end of the tether is configured to couple to the visualization device and a second end of the tether is coupled to the actuator; and
    control circuitry configured to:
        determine an attachment status of the visualization device with respect to a support, wherein the support comprises an interface device configured to couple to a head of the user, based on sensor data received at the control circuitry from one or more sensors positioned on the visualization device, the interface device, or any combination thereof; and
        provide control signals to the actuator to retrieve the tether in response to determining that the attachment status of the visualization device transitions from an attached configuration in which the visualization device is attached to the support to a detached configuration in which the visualization device is detached from the support.

2. The retraction system of claim 1, wherein the control circuitry is configured to:
    monitor a time of operation, a position of the visualization device, or both;
    wherein determining that the attachment status of the visualization device transitions from the attached configuration to the detached configuration comprises determining that the visualization device transitions from the attached configuration to the detached configuration within at least one of a target time period based on the time of operation, a target location based on the position of the visualization device, or both.

3. The retraction system of claim 1, wherein the control circuitry is configured to:
    monitor an occupancy status of a seat associated with the visualization device based on occupancy sensor data received from at least one occupancy sensor; and
    provide additional control signals to the actuator to maintain a threshold force on the tether to maintain the tether in a retracted position while the occupancy status of the seat indicates that the seat is unoccupied.

4. The retraction system of claim 1, wherein the control circuitry is configured to:
    determine a storage status of the visualization device based on additional sensor data received from one or more additional sensors;
    wherein providing the control signals to the actuator to retrieve the tether is in response to determining that the attachment status of the visualization device transitions from the attached configuration to the detached configuration and that the storage status of the visualization device indicates that the visualization device is in the detached configuration without being placed in a storage receptacle within a threshold period of time.

5. The retraction system of claim 1, comprising power cables that extend through the tether to provide power to components of the visualization device.

6. The retraction system of claim 1, comprising the visualization device, wherein the one or more sensors are positioned on the visualization device.

7. The retraction system of claim 1, wherein the one or more sensors comprise one or more contact sensors, one or more proximity sensors, one or more optical sensors, one or more cameras, one or more motion sensors, or any combination thereof.

8. The retraction system of claim 1, wherein the retraction assembly is integrated into a ride vehicle configured to carry the user during a ride experience.

9. A method of operating a retraction system for a visualization device configured to present virtual imagery to a user, the method comprising:
    receiving, at a processor system including one or more processors and from one or more sensors, sensor data indicative of an attachment status of the visualization device with respect to a support, wherein the support comprises an interface device configured to couple to the head of the user, and the one or more sensors are positioned on the visualization device, the interface device, or any combination thereof;
    determining, using the processor system and based on the sensor data, that the attachment status of the visualization device transitions from an attached configuration in which the visualization device is attached to the support to a detached configuration in which the visualization device is detached from the support; and
    providing, using the processor system, control signals to an actuator to retrieve a tether coupled to the visualization device in response to determining that the attachment status of the visualization device transitions from the attached configuration to the detached configuration.

10. The method of claim 9, comprising:
    monitoring, using the processor system, a time of operation, a position of the visualization device, or both;
    wherein determining that the attachment status of the visualization device transitions from the attached configuration to the detached configuration comprises determining that the attachment status of the visualization device transitions from the attached configuration to the detached configuration within at least one of a target time period based on the time of operation, a target location based on the position of the visualization device, or both.

11. The method of claim 9, comprising:
    monitoring, using the processor system, an occupancy status of a seat associated with the visualization device based on occupancy sensor data received from at least one occupancy sensor; and providing, using the processor system, additional control signals to maintain a threshold force on the tether to maintain the tether in a retracted position while the occupancy status of the seat indicates that the seat is unoccupied.

12. The method of claim 9, comprising providing, using the processor system and while a ride vehicle moves the user through a ride experience, the control signals to the actuator to retrieve the tether to retract the visualization device into a storage receptacle defined in the ride vehicle in response to determining that the attachment status of the visualization device transitions from the attached configuration to the detached configuration.

13. The method of claim 9, comprising providing, using the processor system and while the visualization device is coupled to the interface device, the control signals to the actuator to retrieve the tether coupled to the visualization device and the interface device in response to determining that the attachment status of the visualization device transitions from the attached configuration to the detached configuration.

14. An augmented reality, virtual reality, and/or mixed reality (AR/VR) system, comprising:
a visualization device configured to be worn by a user and to display virtual features to the user;
a retraction assembly comprising an actuator and a tether, wherein a first end of the tether is coupled to the visualization device and a second end of the tether is coupled to the actuator; and
control circuitry communicatively coupled to and configured to provide control signals to the actuator to retrieve or release the tether with the visualization device based on an attachment status of the visualization device with respect to a head of the user, a configuration status of the visualization device with respect to an interface device that is configured to couple the visualization device to the head of the user, an occupancy status of a seat associated with the visualization device, or any combination thereof.

15. The AR/VR system of claim 14, comprising:
one or more sensors supported on the visualization device and configured to generate sensor data indicative of the attachment status of the visualization device;
wherein the control circuitry is configured to provide the control signals to the actuator to retrieve the tether with the visualization device in response to the attachment status of the visualization device transitioning from an attached status to a detached status on the head of the user.

16. The AR/VR system of claim 15, wherein at least one of the one or more sensors is supported on the visualization device to align with at least one aperture on the interface device to enable the at least one of the one or more sensors to detect the head of the user.

17. The AR/VR system of claim 14, comprising:
at least one occupancy sensor configured to generate occupancy sensor data indicative of the occupancy status of the seat associated with the visualization device;
wherein the control circuitry is configured to provide the control signals to the actuator to retrieve the tether and to maintain the visualization device in a retracted position while the occupancy status of the seat associated with the visualization device indicates that the seat is unoccupied.

18. The AR/VR system of claim 14, comprising a ride vehicle configured to carry the user through a ride experience, wherein the retraction assembly is coupled to the ride vehicle.

19. A retraction system for retracting a visualization device configured to present virtual imagery to a user, the retraction system comprising:
a retraction assembly comprising an actuator and a tether, wherein a first end of the tether is configured to couple to the visualization device and a second end of the tether is coupled to the actuator; and
control circuitry configured to:
determine an attachment status of the visualization device with respect to a support, wherein the support comprises a head of the user, based on sensor data received at the control circuitry from one or more sensors positioned on the visualization device, an interface device, or any combination thereof, wherein the interface device is configured to couple the visualization device to the head of the user; and
provide control signals to the actuator to retrieve the tether in response to determining that the attachment status of the visualization device transitions from an attached configuration in which the visualization device is attached to the support to a detached configuration in which the visualization device is detached from the support.

20. A method of operating a retraction system for a visualization device configured to present virtual imagery to a user, the method comprising:
receiving, at a processor system including one or more processors and from one or more sensors, sensor data indicative of an attachment status of the visualization device with respect to a support, wherein the one or more sensors are positioned on the visualization device, an interface device, or any combination thereof, the support comprises a head of the user, and the interface device is configured to couple the visualization device to the head of the user;
determining, using the processor system and based on the sensor data, that the attachment status of the visualization device transitions from an attached configuration in which the visualization device is attached to the support to a detached configuration in which the visualization device is detached from the support; and
providing, using the processor system, control signals to an actuator to retrieve a tether coupled to the visualization device in response to determining that the attachment status of the visualization device transitions from the attached configuration to the detached configuration.

* * * * *